(12) United States Patent
Jiang et al.

(10) Patent No.: US 8,562,877 B2
(45) Date of Patent: *Oct. 22, 2013

(54) METHOD FOR MAKING CARBON NANOTUBE STRUCTURE

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 532 days.

This patent is subject to a terminal disclaimer.

(21) Appl. No.: 12/889,535

(22) Filed: Sep. 24, 2010

(65) Prior Publication Data

US 2011/0156302 A1    Jun. 30, 2011

Related U.S. Application Data

(63) Continuation of application No. 12/825,418, filed on Jun. 29, 2010.

(30) Foreign Application Priority Data

Dec. 31, 2009    (CN) .......................... 2009 1 0239663

(51) Int. Cl.
| | |
|---|---|
| *B29C 53/14* | (2006.01) |
| *B29C 53/16* | (2006.01) |
| *B29C 53/80* | (2006.01) |
| *B29C 53/84* | (2006.01) |
| *B82B 3/00* | (2006.01) |
| *B82Y 40/00* | (2011.01) |
| *D02G 3/02* | (2006.01) |

(52) U.S. Cl.
USPC ........... 264/103; 264/160; 264/163; 264/164; 264/165; 264/232; 264/280; 264/340; 423/445 B

(58) Field of Classification Search
USPC ......... 264/103, 160, 163, 164, 165, 232, 280, 264/340; 423/445 B
See application file for complete search history.

(56) References Cited

U.S. PATENT DOCUMENTS

| | | | |
|---|---|---|---|
| 2006/0108906 A1* | 5/2006 | Gosain et al. ................. | 313/309 |
| 2007/0292614 A1* | 12/2007 | Liu et al. .................... | 427/249.1 |
| 2008/0018012 A1* | 1/2008 | Lemaire et al. ................. | 264/82 |
| 2008/0170982 A1 | 7/2008 | Zhang et al. | |
| 2008/0248235 A1 | 10/2008 | Feng et al. | |
| 2009/0298239 A1 | 12/2009 | Liu et al. | |

FOREIGN PATENT DOCUMENTS

TW    200952087    12/2009

OTHER PUBLICATIONS

Jeong et al., Effect of catalyst pattern geometry on the growth of vertically aligned carbon nanotube arrays, Carbon, vol. 47, pp. 696-704,(2009).
Liming Dai et al. Controlled Synthesis and Modification of Carbon Nanotubes and C60:Carbon Nanostructwes for Advanced Polymeric Composite Materials. Advanced Materials. vol. 13, No. 12-13, Jul. 2001. pp. 899-913.

* cited by examiner

*Primary Examiner* — Leo B Tentoni
(74) *Attorney, Agent, or Firm* — Altis & Wispro Law Group, Inc.

(57) ABSTRACT

A method for making a carbon nanotube structure is provided. The method includes the following steps. A carbon nanotube array on a substrate is provided. The carbon nanotube array is divided with a separating line to form a strip-shaped carbon nanotube array. A carbon nanotube film is pulled out from the strip-shaped carbon nanotube array.

20 Claims, 10 Drawing Sheets

METHOD FOR MAKING CARBON NANOTUBE STRUCTURE

CROSS-REFERENCE TO RELATED APPLICATION

This application is a continuation of U.S. patent application 12/825418, filed Jun. 29, 2010, entitled, "CARBON NANOTUBE PRECURSOR" and claims all benefits accruing under 35U.S.C. §119 from China Patent Application No. 200910239663.8, filed on 2009/12/31, in the China Intellectual Property Office, disclosure of which is incorporated herein by reference.

BACKGROUND

1. Technical Field

The present disclosure relates to a method for making a carbon nanotube structure, such as a carbon nanotube film, or a carbon nanotube wire.

2. Description of Related Art

Carbon nanotubes are tubules of carbon generally having a diameter of about 0.5 nanometers to about 100 nanometers, and composed of a number of coaxial cylinders of graphite sheets. Generally, the carbon nanotubes prepared by conventional methods are in particle or powder forms. The particle or powder-shaped carbon nanotubes limit the applications in which they can be used. Thus, preparation of macro-scale carbon nanotube structures, such as carbon nanotube films, has attracted attention.

A method for drawing a carbon nanotube film is disclosed in US pre-grant publication NO. 2008/0248235A1 to Feng et al., published on Oct. 9, 2008.This patent publication discloses a carbon nanotube film which is directly drawn from a carbon nanotube array on a substrate. The carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. This carbon nanotube film is a free standing film because the adjacent carbon nanotube segments are joined end-to-end by van der Waals attractive force therebetween.

Generally, a length of the carbon nanotube film is inevitably affected by the largest width of the carbon nanotube array or the largest width of the substrate. Thus, it is difficult to obtain a carbon nanotube film having a larger length.

What is needed, therefore, is to provide a method for making a carbon nanotube structure, such as a carbon nanotube film, or a carbon nanotube wire. The carbon nanotube structure has a length larger than a length of a carbon nanotube structure fabricated by the carbon nanotube array.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
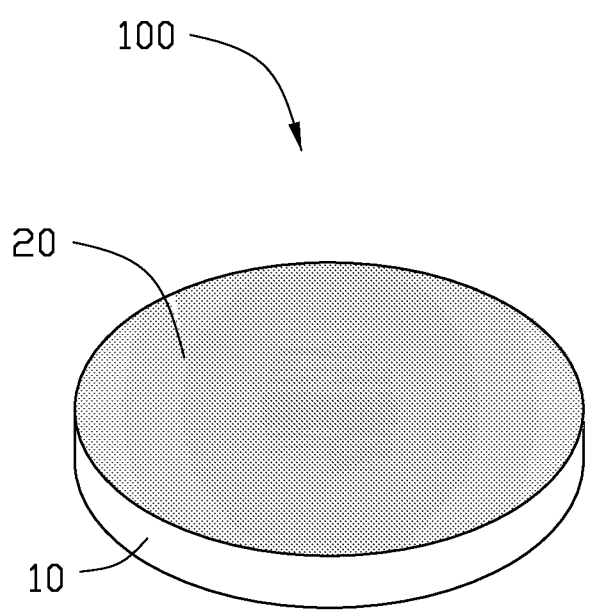
FIG. 1 is a schematic structural view of an embodiment of a carbon nanotube precursor.
Figure 2:
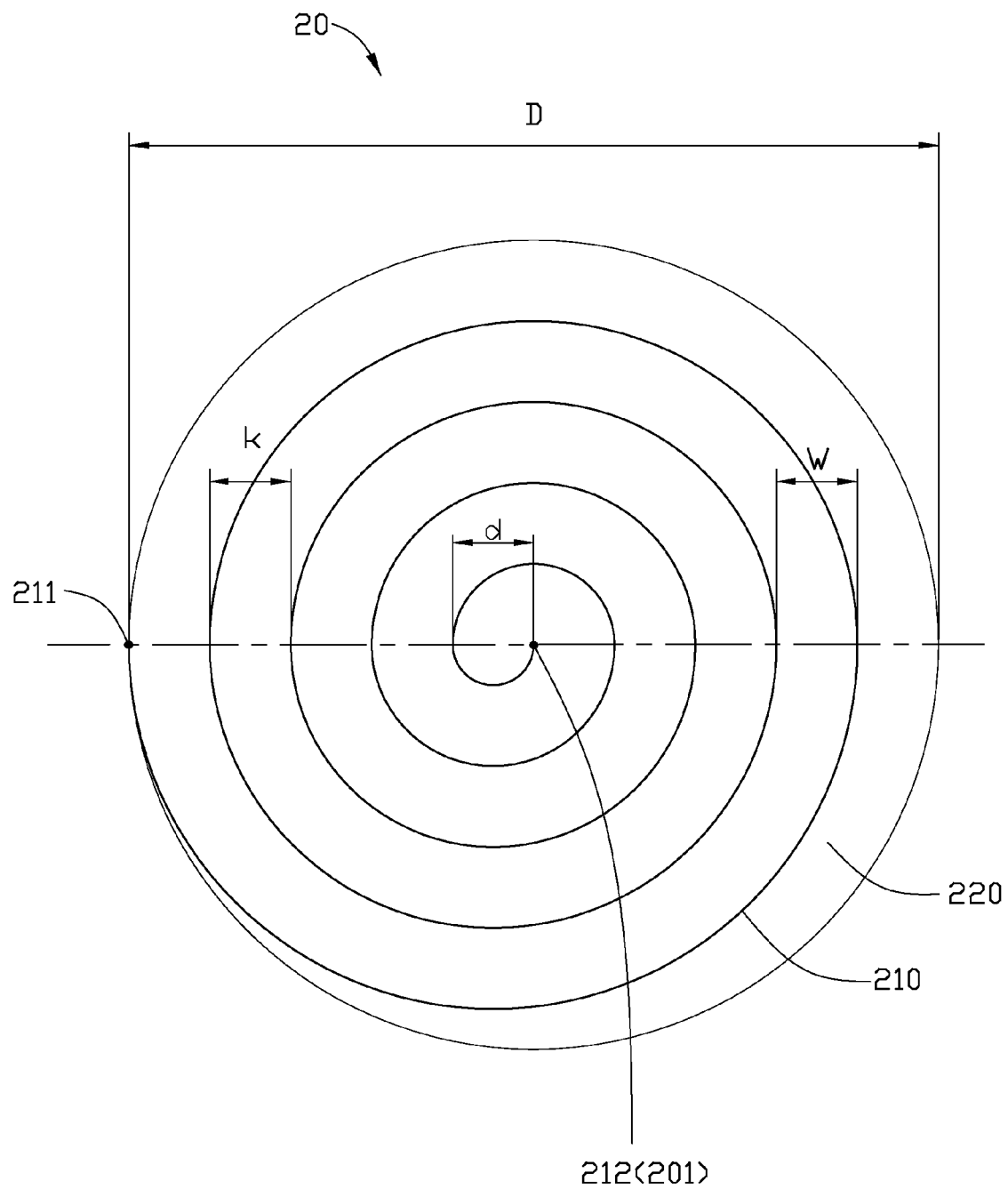
FIG. 2 is a schematic top plan of the carbon nanotube precursor shown in FIG. 1.

Referring to FIG. 1 and FIG. 2, a carbon nanotube precursor 100 of one embodiment is shown. The carbon nanotube precursor 100 includes a substrate 10, a carbon nanotube array 20 disposed on the substrate 10, and a separating line 210 defined in the carbon nanotube array 20.

The substrate 10 can be a silicon wafer configured for growing the carbon nanotube array 20, or a panel configured for loading the carbon nanotube array 20. A shape of the substrate 10 can be round or square. The silicon wafer can be a P-type silicon wafer, an N-type silicon wafer, or a silicon wafer with a film of silicon dioxide thereon. The panel can have an adhesion thereon. An end of the carbon nanotube array 20 can be adhered on the panel. In one embodiment, a round 4-inch P-type silicon wafer is used as the substrate 10.

The carbon nanotube array 20 includes a plurality of carbon nanotubes combined by van der Waals attractive force therebetween. The carbon nanotubes can be substantially parallel to each other and arranged substantially along a same direction. The carbon nanotubes can be substantially perpendicular to the substrate 10. A largest width of the carbon nanotube array 20 can be defined as D. The largest width of the carbon nanotube array 20 is a distance of two farthest points in the outer edge of the carbon nanotube array 20. Macroscopically, the carbon nanotube array 20 can be a film structure substantially parallel to the substrate 10, due to a small height of the carbon nanotubes of the carbon nanotube array 20. Thus, a geometric centre 201 of a surface of the carbon nanotube array 20 can be also a geometric centre of the carbon nanotube array 20. The two farthest points in the outer edge of the carbon nanotube array 20 can be two farthest points in a surface of the carbon nanotube array 20 or a surface of the substrate 10. A shape of the carbon nanotube array 20 can be round, square, or other shape. In one embodiment, the carbon nanotube array 20 is a round film structure loaded on the round 4-inch P-type silicon wafer. Thus, the largest width D of the carbon nanotube array 20 is substantially equal to a diameter of the round substrate 10, such as 4 inches.

The separating line 210 can be configured to make the carbon nanotube array 20 discontinuous in macro-scale. Alternatively, the separating line 210 can be a separating groove having a predetermined width and a predetermined height in micro-scale. A width of the separating groove is not limited, just so that the carbon nanotubes are separated by the separating groove are not joined together with each other by the van der Waals attractive force. For example, the width of the separating groove can be 1 micrometer, 2 micrometers, or 1 millimeter. In one embodiment, the width of the separating groove is greater than 2 micrometers. The height of the separating groove can substantially equal to the heights of the carbon nanotubes of the carbon nanotube array 20.

A strip-shaped carbon nanotube array 220 can be formed in the carbon nanotube array 20 by the separating line 210. A size of the strip-shaped carbon nanotube array 220, substantially along an extending direction can be defined as a length of the strip-shaped carbon nanotube array 220. The length of the strip-shaped carbon nanotube array 220 can be substantially equal to a length of a median line of the strip-shaped carbon nanotube array 220. The strip-shaped carbon nanotube array 220 can have two boundary lines along the extending direction. The boundary lines can include the separating line 210, and a boundary line of the carbon nanotube array 20. A distance between two opposite ends of one boundary line of the strip-shaped carbon nanotube array 220 can be substantially equal to a distance between two opposite ends of the other boundary line of the strip-shaped carbon nanotube array 220. The length of the strip-shaped carbon nanotube array 220 can be defined as L. A size of the strip-shaped carbon nanotube array 220, substantially along a normal of the median line can be defined as a width of the strip-shaped carbon nanotube array 220. The normal is a line substantially perpendicular to the median line. The width of the strip-shaped carbon nanotube array 220 can be defined as W.

The length L of the strip-shaped carbon nanotube array 220 can be greater than a largest width D of the carbon nanotube array 20. A length of the carbon nanotube structure drawn from the strip-shaped carbon nanotube array 220 can be substantially directly proportional to the length L of the strip-shaped carbon nanotube array 220. Thus, the length L of the strip-shaped carbon nanotube array 220 can only affect the largest length of the carbon nanotube structure, if the largest width D of the carbon nanotube array 20 is a predetermined value. The width W can be substantially uniform, thus, a carbon nanotube structure drawn from the carbon nanotube array 20 can have a uniform width.

The separating line 210 can have a first end 211 and a second end 212 opposite the first end 211. A direction substantially extending from the first end 211 to the second end 212 of the separating line 210 can be defined as a lengthwise direction. The separating line 210 can spiral from a point on the edge of the carbon nanotube array 20 to the geometric centre 201 of the carbon nanotube array 20, along the lengthwise direction, simultaneously, the first end 211 can intersect with the edge of the carbon nanotube array 20. The second end 212 can be close to the geometric centre 201. In one embodiment, the separating line 210 includes a plurality of semicircular lines joined end-to-end. Circular centers of the semicircular lines can be laid on a datum line. Semicircular lines of odd numbers can be concentric semicircular lines; and semicircular lines of even numbers can be concentric semicircular lines. The semicircular lines have a diameter increasing along a direction from the geometric centre 201 to the edge of the carbon nanotube array 20. Diameters of adjacent semicircular lines can have a substantially uniform difference defined as k, an arithmetic progression consisting of the diameters of the semicircular lines can be formed.

A smallest diameter of the semicircular lines can be defined as d. If the smallest diameter d is substantially equal to the difference k, the largest width D of the carbon nanotube array 20 can be a multiple of the difference k and shown by the formula k=D/n. Wherein the n is a natural number greater than 2. Thus, more carbon nanotubes of carbon nanotube array 20 can be located on the strip-shaped carbon nanotube array 220. The length of the separating line 210 can be about πD(D−k)/2 k. If the diameter D is a certain value, the smaller the difference k, the greater the length of the separating line 210, the greater the length L of the strip-shaped carbon nanotube array 220. Thus, the length L of the strip-shaped carbon nanotube array 220 can correspond to the difference k. For example, if the diameter D is about 4 inches, the difference k is about 0.4 inches, the length L of the strip-shaped carbon nanotube array 220 can be greater than 30 inches. Thus, a carbon nanotube structure having a greater length can be obtained.

Figure 3:
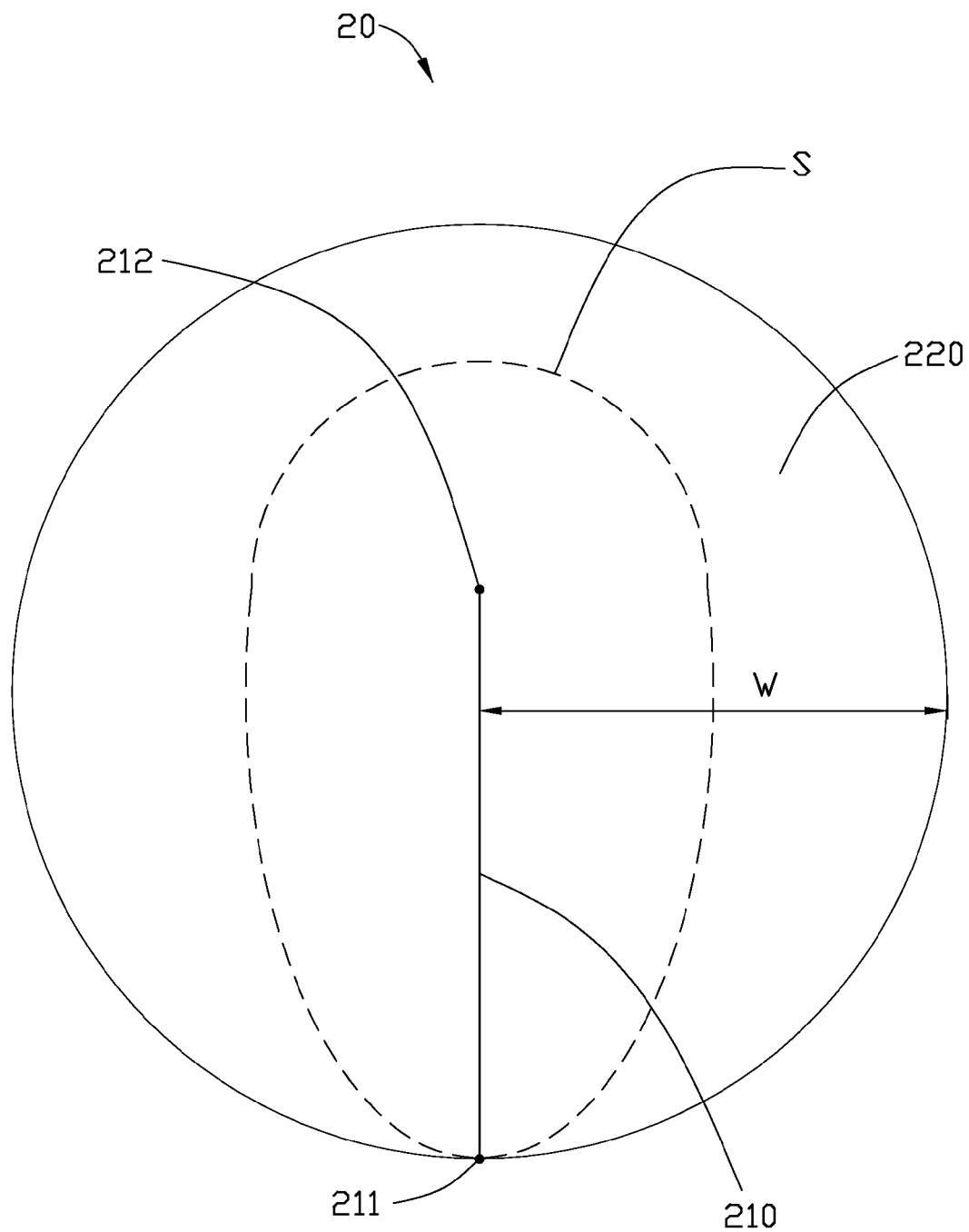
FIGS. 3-6 are schematic top plans of various carbon nanotube precursors.
Figure 4:
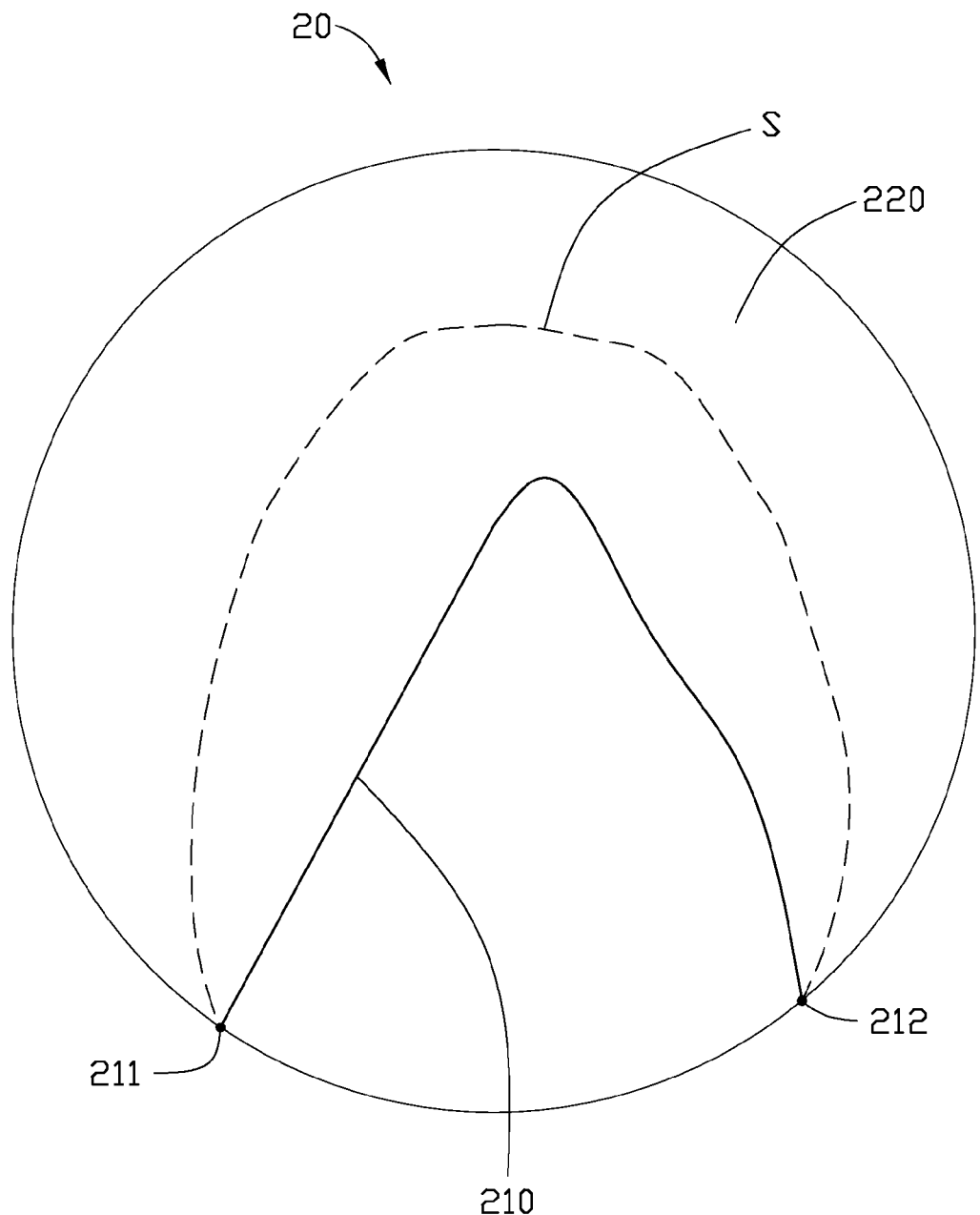
Figure 5:
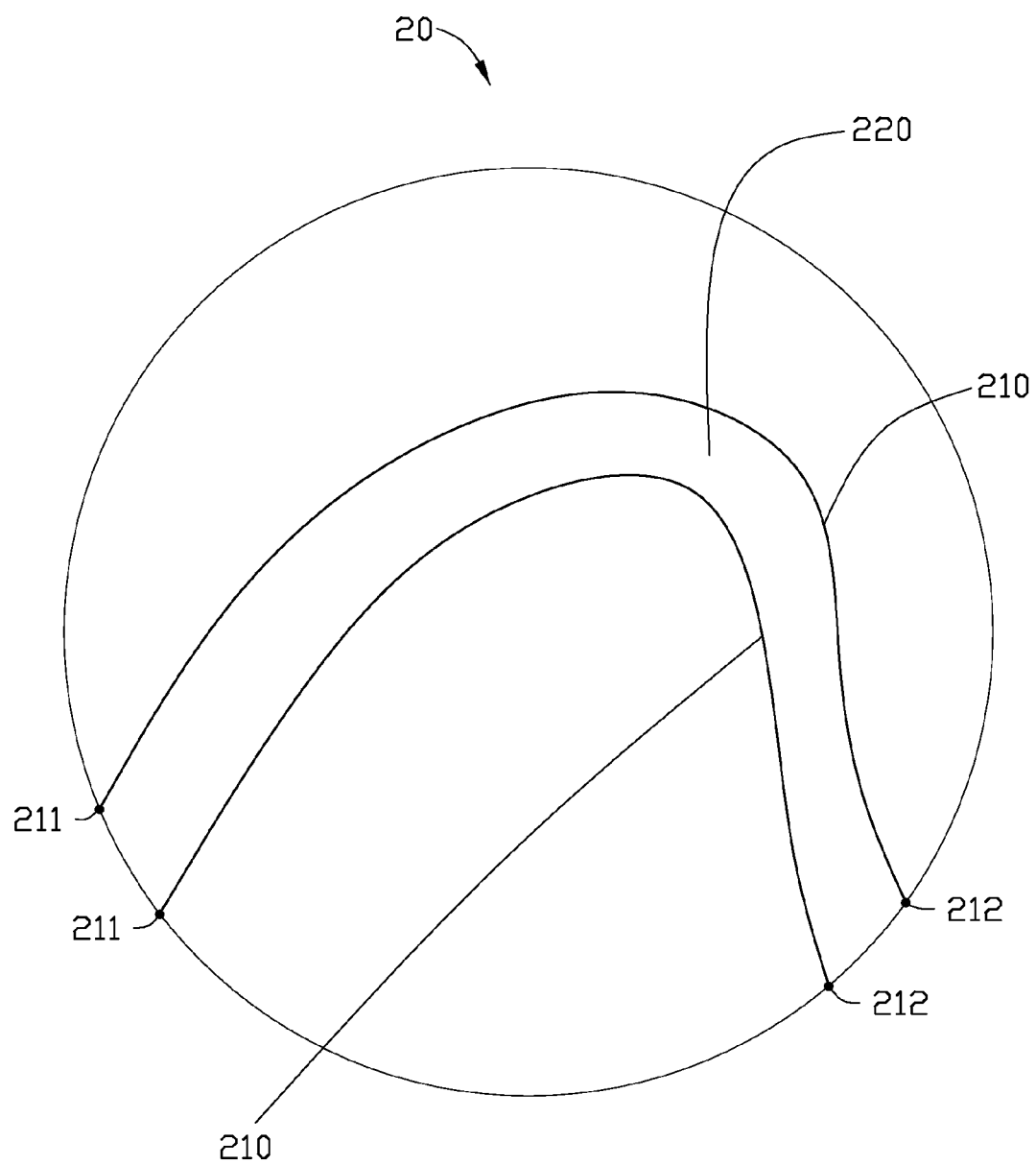

A shape of the substrate 10 is not limited. The shape of the substrate 10 can be square, round, or other shapes. A shape of the separating line 210 is not limited. The shape of the separating line 210 can be straight line, curve, or any combination thereof. The separating line 210 can have just one end, such as the first end 211, intersecting with the edge of the carbon nanotube array 20. The separating line 210 can also have two ends, such as the first end 211 and the second end 212, intersecting with the edge of the carbon nanotube array 20. The carbon nanotube precursor 100 can include two or more separating lines 210, if only at least one strip-shaped carbon nanotube 220 has a length greater than the largest width D of the carbon nanotube array 20. Referring to FIG. 3, in one embodiment, the separating line 210 has the length less than the largest width D of the carbon nanotube array 20. The length L of the strip-shaped carbon nanotube array 220 is substantially equal to a length of a dashed S as shown in FIG. 3. The dashed S can substantially be the median line of the strip-shaped carbon nanotube array 220. Referring to FIG. 4, in one embodiment, the separating line 210 has a length greater than the largest width D of the carbon nanotube array 20. The first end 211 and the second end 212 of the separating line 210 intersect with the edge of the carbon nanotube array 20. One strip-shaped carbon nanotube array 220 has a length substantially equal to a length of a dashed S as shown in FIG. 4. Referring to FIG. 5, in one embodiment, the carbon nanotube array 20 is divided by two separating lines 210 substantially parallel to each other, a strip-shaped carbon nanotube array 220 having a substantially uniform width W can be obtained, thus, the carbon nanotube structure drawn from the carbon nanotube array 20 can have a uniform width W.

Figure 6:
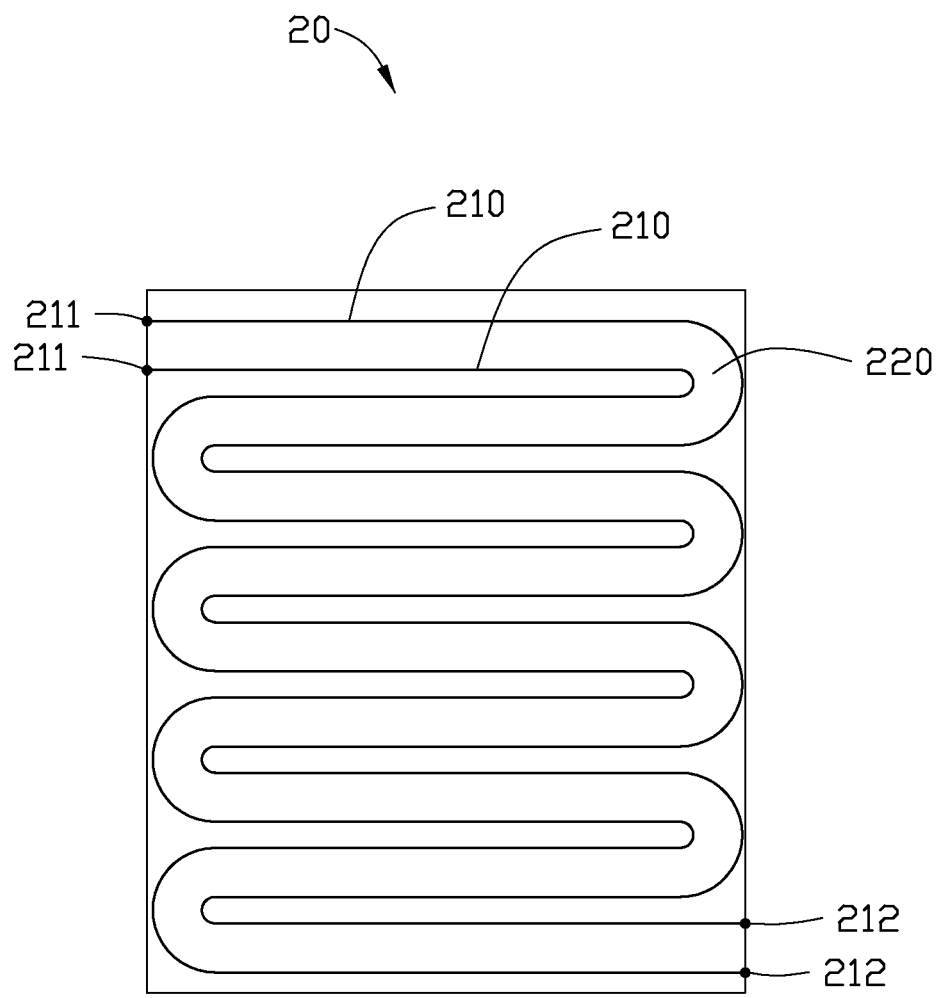

Referring to FIG. 6, in one embodiment, the carbon nanotube array 20 is a rectangle carbon nanotube array. The carbon nanotube array 20 is divided by two separating lines 210 substantially parallel to each other to obtain a strip-shaped carbon nanotube array 220 having a substantially uniform width W.

A method for making a carbon nanotube structure using the carbon nanotube precursor 100 of one embodiment can include the following steps:

S10, proving a carbon nanotube precursor 100 comprising a carbon nanotube array 20, and a separating line 210 dividing the carbon nanotube array 20 to define a strip-shaped carbon nanotube array 220, wherein the length of the strip-shaped carbon nanotube array 220 is greater than the largest width D of the carbon nanotube array 20; and S20, pulling a carbon nanotube film out from the strip-shaped carbon nanotube array 220 along a direction substantially perpendicular to a longitudinal direction of the carbon nanotubes of the carbon nanotube array 20.

In step S10, the carbon nanotube precursor 100 can be formed by the following steps:

S11, providing a substantially flat and smooth substrate;

S12, forming a catalyst layer on the substrate;

S13, annealing the substrate with the catalyst layer thereon in air at a temperature in an approximate range from 300 degrees to 900 degrees for about 30 to about 90 minutes;

S14, heating the substrate with the catalyst layer thereon at a temperature in an approximate range from 500° C. to 900° C. (such as 740° C.) in a furnace with a protective gas therein, and supplying a carbon source gas to the furnace from about 5 to about 30 minutes and growing a carbon nanotube array on the substrate; and S15, defining the separating line in the carbon nanotube array.

In step S11, the substrate 10 can be a P-type silicon wafer, an N-type silicon wafer, or a silicon wafer with a film of silicon dioxide thereon. Simultaneously, a 4-inch P-type silicon wafer can be used as the substrate 10. In step S12, the catalyst can be made of iron (Fe), cobalt (Co), nickel (Ni), or any combination thereof.

In step S14, the protective gas can be made up of at least one of nitrogen ($N_2$), ammonia ($NH_3$), or a noble gas. The carbon source gas can be a hydrocarbon gas, such as ethylene ($C_2H_4$), methane ($CH_4$), acetylene ($C_2H_2$), ethane ($C_2H_6$), or any combination thereof.

The carbon nanotube array 20 is a super-aligned array of the carbon nanotubes. The super-aligned array can, opportunely, have a height of about 2 microns to about 10 millimeters and includes a plurality of carbon nanotubes substantially parallel to each other and approximately perpendicular to the substrate 10. In one embodiment, the carbon nanotubes have a height of about 100 microns to about 900 microns. The super-aligned array of carbon nanotubes formed under the above conditions is essentially free of impurities, such as carbonaceous or residual catalyst particles. The carbon nanotubes in the super-aligned array are closely packed together by the van der Waals attractive force.

In step S15, the separating line 210 can be defined by irradiating, eroding, or other mechanical methods in the carbon nanotube array 20. The separating line 210 can divide the carbon nanotube array 20 to form the strip-shaped carbon nanotube array 220. The separating line 210 can be a spiral line rotating with the geometric centre 201 from the second end 212 to the first end 211. In one embodiment, the separating line 210 includes a plurality of semicircular lines joined end-to-end. Circular centers of the semicircular lines can be laid on the datum line. Semicircular lines with odd number can be concentric semicircular lines; a circular center of the semicircular lines with an odd number is defined as M1. Semicircular lines with even number can be concentric semicircular lines; a circular center of the semicircular lines with even number is defined as M2. The semicircular lines have a diameter increasing along a direction from the geometric centre 201 to the edge of the carbon nanotube array 20. Adjacent semicircular lines can have a substantially uniform difference defined as k, an arithmetic progression consisting of the diameters can be formed.

In step S20, the carbon nanotube film 30 can be drawn out from the strip-shaped carbon nanotube array 220 by the steps of: S21, contacting the strip-shaped carbon nanotube array 220 with a tool; and S21, moving the tool away from the strip-shaped carbon nanotube array 220.

In step S21, the tool can be an adhesive device including a body with a side surface, and the side surface can be covered by an adhesive layer. The side surface of the body can be made of a material that has a great attractive force to the carbon nanotubes. Therefore, the side surface of the body can be used as a contacting surface to contact with a plurality of carbon nanotubes of the carbon nanotube array 20, and the carbon nanotubes can be firmly adhered to the side surface of the tool.

In step S22, when the tool is moved away from the strip-shaped carbon nanotube array 220, a plurality of carbon nanotube segments can be pulled out from the strip-shaped carbon nanotube array 220 end-to-end to form a carbon nanotube film 30, due to the van der Waals attractive force between adjacent carbon nanotube segments. During the pulling process, an angle between a drawn direction of pulling the carbon nanotube film 30 and the longitudinal direction of the carbon nanotubes of the carbon nanotube array 20 can be in a range of about 30 degrees to about 90 degrees. In one embodiment, the angle between the drawing direction and the longitudinal direction is about 85 degrees. An angle of about 85 degrees has been found to improve a uniformity of the carbon nanotube film 30. The longitudinal direction is substantially parallel to the central axes of most of carbon nanotubes.

Figure 10:
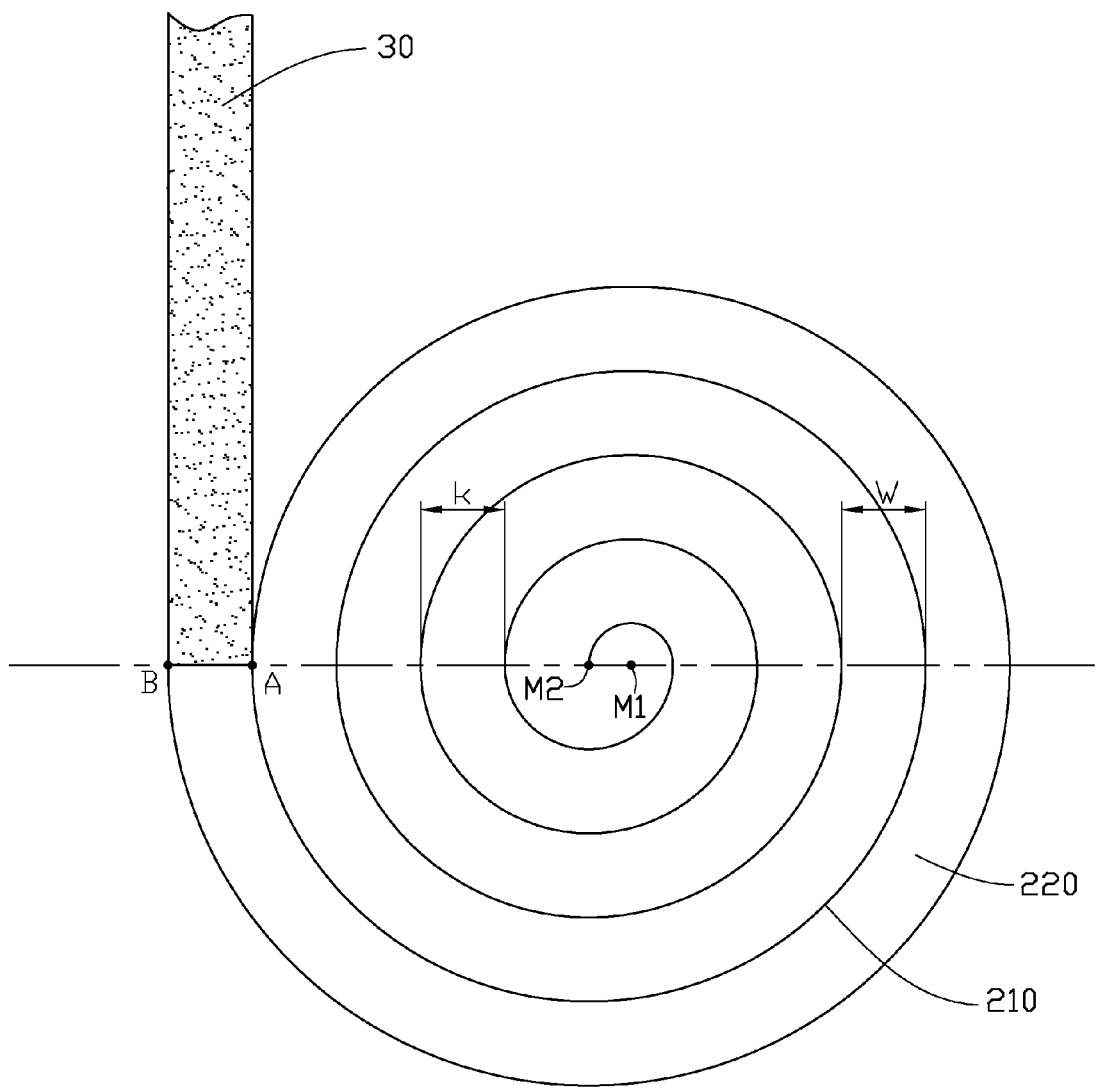
FIG. 10 shows a schematic top plan of a method for making a carbon nanotube film.

A boundary between the carbon nanotube film 30 and the strip-shaped carbon nanotube array 220 can be formed. The boundary is a straight line substantially parallel to the surface of the carbon nanotube array 20 and intersecting with the median line. The boundary can be defined as AB as shown in FIG. 10. When the carbon nanotube film is pulled out by the tool, a relative rotation is formed between the tool and the carbon nanotube array 20 to form a substantially uniform angle between the boundary and the normal of the median line. If the angle is substantially equal to 0 degrees. A moving trajectory of the tool can be substantially perpendicular to the normal of the median line, and the substrate 10 can rotate to keep the drawn direction substantially perpendicular to the normal of the median line.

When the center is not the geometric center, the carbon nanotube array 20 or the substrate 10 can rotate with the circular center M1 and the circular center M2 alternatively. Typically, the moving trajectory of the tool is substantially a straight line. The circular center M1 and the circular center M2 can be defined as a rotation center of the carbon nanotube array 20 alternatively. For example, when the circular center is M2, the carbon nanotube array 20 will rotate 360 degrees. The carbon nanotube array 20 would rotate 180 degrees when the circular center is M1. Then, the rotation center of the carbon nanotube array 20 would be changed, whenever the carbon nanotube array 20 has rotated 180 degrees. The predetermined distance is a distance between the circular center M1 and the circular center M2. Thus, the boundary AB can have a substantially uniform distance. Most of the carbon nanotube film 30 can have a uniform width.

Figure 7:
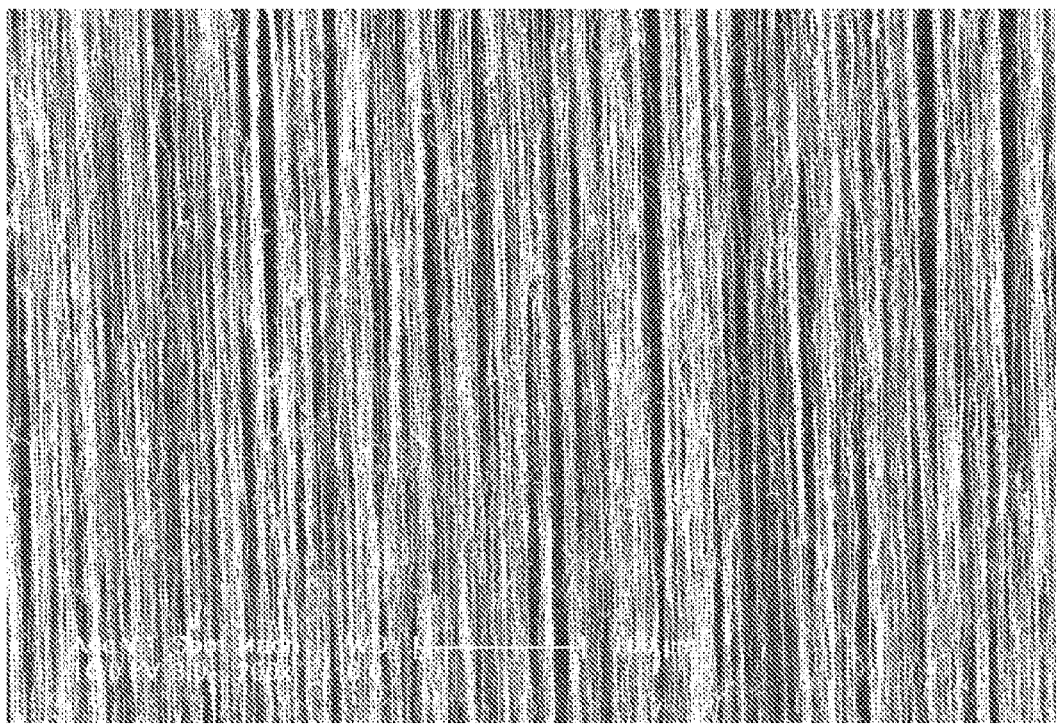
FIG. 7 shows a Scanning Electron Microscope (SEM) image of a part of a carbon nanotube film.

The drawn carbon nanotube film can have a thickness of about 0.5 nanometers to about 100 microns. The drawn carbon nanotube film includes a plurality of carbon nanotubes that can be arranged substantially parallel to a surface of the drawn carbon nanotube film as shown in FIG. 7. A plurality of micropores having a size of about 1 nanometer to about 500 nanometers can be defined by the carbon nanotubes. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. More specifically, the drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. A small number of the carbon nanotubes are randomly arranged in the drawn carbon nanotube film, and has a small if not negligible effect on the larger number of the carbon nanotubes in the drawn carbon nanotube film arranged substantially along the same direction. The carbon nanotube film is capable of forming a free-standing structure. The term "free-standing structure" can be defined as a structure that does not have to be supported by a substrate. For example, a free-standing structure can sustain the weight of itself when it is hoisted by a portion thereof without any significant damage to its structural integrity. The free-standing structure of the drawn carbon nanotube film is realized by the successive segments joined end to end by van der Waals attractive force.

Understandably, some variation can occur in the orientation of the carbon nanotubes in the drawn carbon nanotube film as can be seen in FIG. 4. Microscopically, the carbon nanotubes oriented substantially along the same direction may not be perfectly aligned in a straight line, and some curve portions may exist. Furthermore, it can be understood that some carbon nanotubes are located substantially side by side and oriented along the same direction and in contact with each other.

The method for making a carbon nanotube structure using the carbon nanotube precursor 100 can further include the following step: S30, treating the carbon nanotube film 30 to form a carbon nanotube wire.

In Step S30, a length of the carbon nanotube wire can be substantially equal to the length of the carbon nanotube film 30, and is substantially directly proportional to the length of the at least one strip-shaped carbon nanotube array. A diameter of the carbon nanotube wire can correspond to the width of the carbon nanotube film 30, and correspond to the width D of the strip-shaped carbon nanotube array 220. Thus, a carbon nanotube wire having a greater length and a substantially uniform diameter can be obtained.

Figure 8:
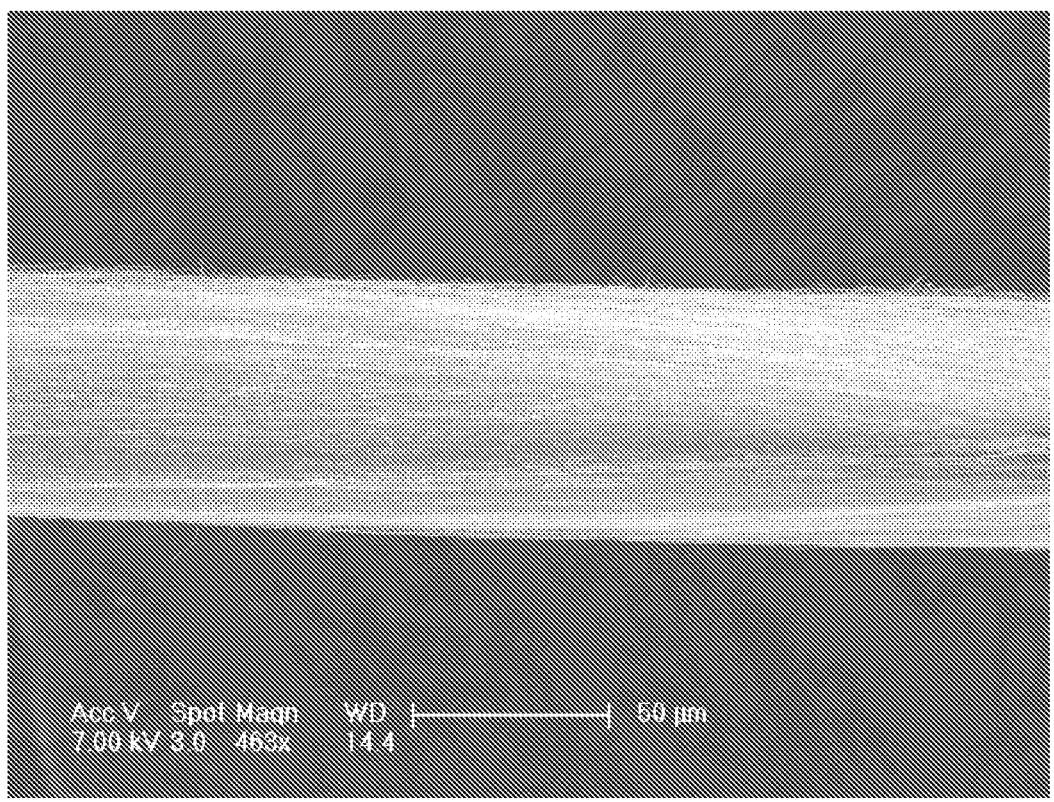
FIG. 8 shows an SEM image of an untwisted carbon nanotube wire.

In Step S30, the carbon nanotube film can be treated with a volatile organic solvent to obtain an untwisted carbon nanotube wire. In one embodiment, the organic solvent can be applied to soak the entire surface of the carbon nanotube film. During the soaking, adjacent parallel carbon nanotubes in the carbon nanotube film 30 will bundle together, due to the surface tension of the organic solvent as it volatilizes, and thus, the carbon nanotube film 30 will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire) as shown in FIG. 8. The carbon nanotubes are parallel to the axis of the untwisted carbon nanotube wire. In one embodiment, the untwisted carbon nanotube wire includes a plurality of successive carbon nanotubes joined end to end by van der Waals attractive force therebetween.

Figure 9:
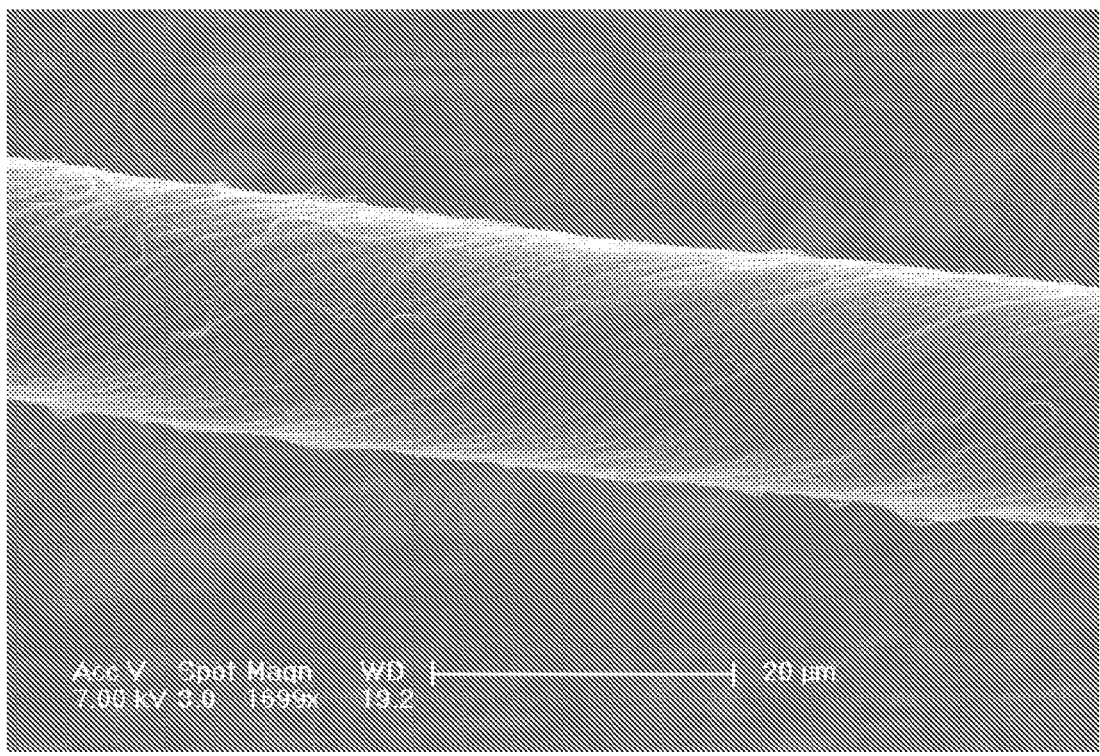
FIG. 9 shows an SEM image of a twisted carbon nanotube wire.

The carbon nanotube film can also be treated with a mechanical force. The mechanical force can turn two ends of the carbon nanotube film in opposite directions. Thus, a twisted carbon nanotube wire can be obtained. The twisted carbon nanotube wire can be obtained by twisting a carbon nanotube film using a mechanical force to turn the two ends of the carbon nanotube film in opposite directions. The twisted carbon nanotube wire includes a plurality of carbon nanotubes helically oriented around an axial direction of the twisted carbon nanotube wire as shown in FIG. 9. In one embodiment, the twisted carbon nanotube wire includes a plurality of successive carbon nanotubes joined end to end by van der Waals attractive force therebetween.

A method for making a carbon nanotube structure using the carbon nanotube precursor 100 of one embodiment can include following steps:

S110, proving the carbon nanotube precursor 100 comprising the carbon nanotube array 20, and the separating line 210 dividing the carbon nanotube array 20 to form the strip-shaped carbon nanotube array 220, wherein the length of the strip-shaped carbon nanotube array 220 is greater than a largest width D of the carbon nanotube array 20; and S120, pulling a carbon nanotube film out from the strip-shaped carbon nanotube array 220 along the drawn direction, the drawn direction being substantially perpendicular to the longitudinal direction of the carbon nanotubes of the carbon nanotube array 20.

In step S110, the carbon nanotube precursor 200 can be formed by following steps:

S111, forming a catalyst layer on the substrate, the catalyst layer comprising a separating line and a strip-shaped catalyst layer, wherein a length of the strip-shaped catalyst layer is greater than a largest width of the catalyst layer, the largest width is a distance of two farthest points in the catalyst layer;

S112, annealing the substrate with the strip-shaped catalyst layer thereon in air at a temperature in an approximate range from 300 degrees to 900 degrees for about 30 to about 90 minutes;

S113, heating the substrate with the catalyst layer thereon at a temperature in an approximate range from 500 degrees to 900 degrees in a furnace with a protective gas therein; and S114, supplying a carbon source gas to the furnace for about 5 to about 30 minutes.

The strip-shaped catalyst layer can be formed by the separating line in step S111, thus, the strip-shaped carbon nanotube array 220 can be formed by the strip-shaped catalyst layer in step S114.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the invention. Any elements described in accordance with any embodiments is understood that they can be used in addition or substituted in other embodiments. Embodiments can also be used together. Variations may be made to the embodiments without departing from the spirit of the invention. The above-described embodiments illustrate the scope of the invention but do not restrict the scope of the invention.

What is claimed is:

1. A method for making a carbon nanotube structure, comprising the following steps:
    providing a carbon nanotube array on a substrate;
    dividing the carbon nanotube array with a separating line to form a strip-shaped carbon nanotube array having a length greater than a largest width of the carbon nanotube array; and
    pulling a carbon nanotube film out from the strip-shaped carbon nanotube array along a drawn direction.

2. The method of claim 1, wherein the separating line is a separating groove having a width greater than 1 micrometer.

3. The method of claim 1, wherein the separating line is a separating groove having a width of about 2 micrometers.

4. The method of claim 1, wherein the length of the strip-shaped carbon nanotube array is substantially equal to a length of a median line of the strip-shaped carbon nanotube array.

5. The method of claim 1, wherein the step of pulling the carbon nanotube film out from the strip-shaped carbon nanotube array further comprises a step of forming a substantially constant angle between a boundary and a median line of the strip-shaped carbon nanotube array, wherein the boundary is a straight line that intersects with the median line.

6. The method of claim 5, wherein the separating line is a spiral line along a lengthwise direction thereof.

7. The method of claim 6, wherein the step of pulling the carbon nanotube film out from the strip-shaped carbon nanotube array further comprises a step of having a relative rotation between the substrate and a tool drawing the carbon nanotube film to maintain the substantially constant angle.

8. The method of claim 7, wherein the substantially constant angle between the boundary and the median line is substantially equal to 90 degrees.

9. The method of claim 8, wherein a moving trajectory of the tool is substantially parallel to the median line, and the substrate rotates to keep the drawn direction substantially parallel to the median line.

10. The method of claim 1, wherein the separating line comprises a plurality of semicircular lines joined end-to-end, the semicircular lines with odd number are concentric semicircular lines having a center defined as M1, semicircular lines with even number are concentric semicircular lines having a circular center of the semicircular lines having a center defined as M2, the plurality of semicircular lines have a diameter increasing along a direction from a geometric center of the carbon nanotube array to an edge of the carbon nanotube array.

11. The method of claim 10, wherein a largest diameter of any of the semicircular lines is substantially equal to the largest width of the carbon nanotube array.

12. The method of claim 10, wherein a difference between two diameters of adjacent semicircular lines is substantially uniform.

13. The method of claim 12, wherein a largest diameter of semicircular lines is a multiple of the difference of two diameters of adjacent semicircular lines.

14. The method of claim 10, wherein the step of pulling the carbon nanotube film out from the strip-shaped carbon nanotube array further comprises a step of having a relative rotation between the substrate and a tool drawing the carbon nanotube film, a moving trajectory of the tool is substantially a straight line, the rotation center is alternately selected from the circular center M1 and the circular center M2.

15. The method of claim 1, further comprising a step of treating the carbon nanotube film to form a carbon nanotube wire.

16. The method of claim 15, wherein the carbon nanotube film is treated with a volatile organic solvent to obtain an untwisted carbon nanotube wire.

17. The method of claim 15, wherein the carbon nanotube film is treated with a mechanical force to obtain a twisted carbon nanotube wire.

18. The method of claim 1, wherein the carbon nanotube array is formed by the following steps:
provviding the substrate;
forming a catalyst layer on the substrate; and
annealing the substrate with the catalyst layer thereon in air at a temperature in a range from about 300 degrees to about 900 degrees for about 30 to about 90 minutes;
heating the substrate with the catalyst layer thereon at a temperature in a range from about 500 degrees to about 900 degrees in a furnace with a protective gas therein, and supplying a carbon source gas to the furnace from about 5 to about 30 minutes.

19. A method for making a carbon nanotube structure, comprising the following steps:
providing a substantially flat and smooth substrate;
applying a catalyst layer on the substrate;
defining a separating line on the catalyst layer to form a strip-shaped catalyst layer, wherein a length of the strip-shaped catalyst layer is greater than a largest width of the catalyst layer, the largest width is a distance of two farthest points in the catalyst layer;
forming a strip-shaped carbon nanotube array on the catalyst layer; and
pulling a carbon nanotube film out from the strip-shaped carbon nanotube array.

20. The method of claim 19, wherein forming the strip-shaped carbon nanotube array comprises the following steps:
annealing the substrate with the strip-shaped catalyst layer thereon in air at a temperature in a range from about 300 degrees to about 900 degrees for about 30 to about 90 minutes;
heating the substrate with the catalyst layer thereon at a temperature in a range from about 500 degrees to about 900 degrees in a furnace with a protective gas therein; and
supplying a carbon source gas to the furnace for about 5 to about 30 minutes.

\* \* \* \* \*